United States Patent

Koning

[11] 3,882,731
[45] May 13, 1975

[54] TORQUER SCALE FACTOR TEMPERATURE CORRECTION MEANS

[75] Inventor: Menno G. Koning, Dover, Mass.

[73] Assignee: Northrop Corporation, Los Angeles, Calif.

[22] Filed: July 31, 1973

[21] Appl. No.: 384,246

[52] U.S. Cl................................ 73/497; 74/5.6 D
[51] Int. Cl..................... G01p 15/08; G01c 19/28
[58] Field of Search................. 73/497, 504, 517 B; 74/5.6 D; 318/634

[56] References Cited
UNITED STATES PATENTS

| | | | |
|---|---|---|---|
| 3,122,688 | 2/1964 | Houpt............................... | 318/634 |
| 3,130,589 | 4/1964 | Sawyer.............................. | 73/497 |
| 3,213,692 | 10/1965 | Sawyer.............................. | 73/497 |
| 3,757,189 | 9/1973 | Buchan et al...................... | 318/634 |

Primary Examiner—James J. Gill
Attorney, Agent, or Firm—Kenway & Jenney

[57] ABSTRACT

A correction means for offsetting the effects of varying temperature on the torquer scale factor in a gyroscope, accelerometer, or similar input function measuring instrument having a torque-to-balance feedback servo loop. The correction means comprises an electronic correction network configured in the servo loop of an input function measuring instrument for generating a signal which is a measure of the desired input function and is substantially independent of any change in the torquer scale factor over a specified temperature range.

8 Claims, 4 Drawing Figures

TORQUER SCALE FACTOR TEMPERATURE CORRECTION MEANS

BACKGROUND OF THE INVENTION

This invention relates to gyroscopes, accelerometers, and like instruments having a torque-to-balance feedback servo loop, and more particularly to a means for offsetting variations in the torquer scale factor occurring with temperature changes.

A single degree of freedom rate-integrating gyroscope having a torque-to-balance feedback servo loop is often utilized to measure angular input rates in an inertial guidance system. In a typical torque-to-balance loop, an applied angular input rate causes a precessional displacement of the gyroscope gimbal from its equilibrium position. This displacement, the magnitude of which is proportional to the applied angular input rate, is used to modulate a relatively high frequency a.c. signal by way of a microsyn. A demodulator compares the modulated a.c. signal with a reference a.c. signal and extracts the relatively slowly varying displacement modulation signal. This latter signal is then amplified with a suitable gain factor and applied as a driving current to a magnetic torquer.

In response to the applied displacement signal driving current, the torquer generates a torque on the output shaft of the gyroscope gimbal which is effective to displace the shaft back to its equilibrium position from the non-equilibrium position induced by the applied angular input rate. A measure of the applied angular input rate may be determined from the product of the driving current and a torquer scale factor. In such systems, a low temperature coefficient, precision resistor is connected in series with the torquer coil and the voltage across the resistor (which is proportional to the torquer coil drive current) provides a measure of the applied input rate.

An angular rate measured in this manner is generally subject to significant error in practical applications due to changes in the torquer scale factor of the gyroscope which occur with temperature variation. The major portion of this error results from a change in the magnetic strength of the permanent magnets used in the gyroscope torquer. To a minor extent, the error is due to temperature dependent changes in the angular momentum of the gyroscope wheel and gap dimensions in the torquer. The scale factor error, reflected primarily by torquer scale factor variation with temperature, is often partially compensated in gyroscope systems through the determination of the temperature sensitivites of the magnets of the system and the provision of compensatory electronic networks. Such networks comprise thermistors or other temperature sensitive devices with selected characteristics which are configured in a network to provide an electrical response which offsets the change in the torquer magnet strength. Generally, this method of reducing error from torquer scale factor variation bears a substantial expense in analyzing the detailed characteristics of the magnets in the rate measuring system to determine the temperature dependence of the field strength and to then provide an individual temperature sensitive network which precisely offsets the temperature sensitivity over a specified temperature range. Such a method has the additional limitation that temperature differences may exist between the temperature sensitive compensatory elements and the torquer of the gyroscope, thereby causing the compensatory network to provide an incorrect compensation signal.

An alternative means of reducing torquer scale factor error may also be utilized wherein a computer is used to provide a corrective input signal to the torque-to-balance loop based on a computation of data derived from various sensor information including temperature and the characteristics of the gyroscope. The gyroscope characteristics may be derived from an average of such characteristic curves for a number of similar devices. This method of determining the appropriate compensation requires a significant expense and availability of computational facilities. Further, the computation provides a limited accuracy compensatory signal which is quite dependent on the characteristics of the various devices being compensated.

SUMMARY OF THE INVENTION

Accordingly, it is an object of this invention to provide a means for offsetting temperature dependent torquer scale factor variation in a gyroscope, accelerometer, or similar input function measuring instrument having a torque-to-balance feedback servo loop.

It is another object to provide a correction network configuration for the torque-to-balance servo loop in a rate integrating gyroscope, accelerometer or similar input function measuring instrument, whereby the signal representative of an applied input function is proportional to a weighted sum of the voltages across the torquer coil and a series connected resistor.

In accordance with the invention, a torquer coil in a torque-to-balance loop is connected in series to a resistor having a substantially low temperature coefficient over a specified temperature range, i.e, the resistance of that resistor varies negligibly over the temperature range. A weighted sum network is connected across the coil and resistor for generating an output signal which is representative of an appropriately weighted sum of the voltages appearing across the coil and series resistor and across the resistor alone. The weighting factors for the correction network are predetermined functions (for the specified temperature range) of the nominal resistance of the torquer coil winding, the temperature coefficient thereof, the resistance of the series resistor and the temperature coefficient of the torquer scale factor. The weighted sum network is configured to provide the appropriate weighting to the voltages appearing across the coil and series resistor so that the summed output signal is a measure of the input function applied to the measuring instrument regardless of the change in the torquer scale factor which may occur as the temperature varies over the specified range.

BRIEF DESCRIPTION OF THE DRAWING

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
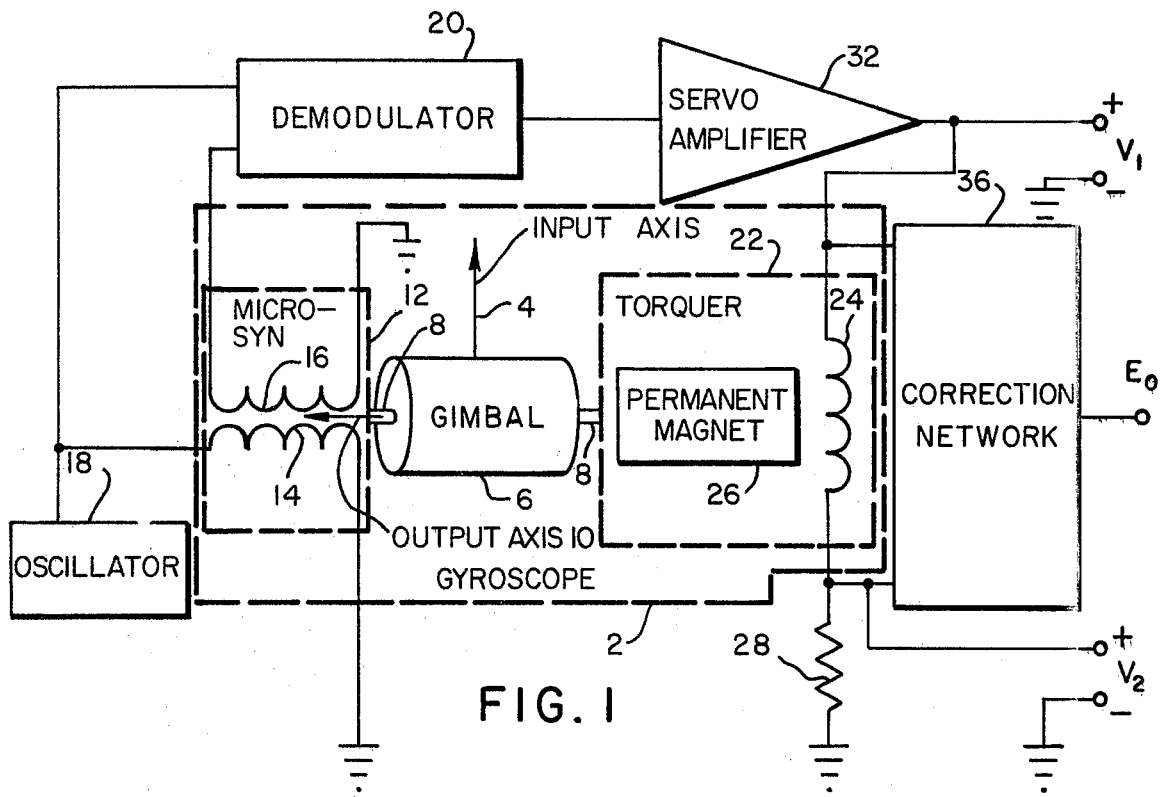
FIG. 1 shows in block diagram form an angular input rate measuring system in accordance with the present invention.

The torque-to-balance feedback servo loop of a single degree of freedom rate-integrating gyroscope system is shown in FIG. 1. A gyroscope 2 has an input axis 4 and a gimbal 6 having an output shaft 8 disposed concentrically about an output axis 10. The gyroscope 2 also includes a microsyn 12 and torquer 22.

The microsyn transducer 12 having a primary coil 14 and secondary coil 16 is coupled to the gyroscope output shaft 8. An oscillator 18 is connected to apply an a.c. signal to the primary coil 14 and to a first input of a demodulator 20. The secondary coil 16 of the microsyn 12 is connected to a second input of the demodulator 20. The microsyn 12 is arranged in a manner such that a rotational displacement of the output shaft 8 in a first direction produces an output signal at the secondary coil 16 which is in phase with the input signal at the primary coil 14. A rotational displacement of the shaft 8 in the other direction produces a signal at coil 16 which is 180° out of phase with the input signal at coil 14. Further, the magnitude of the microsyn output signal is proportional to the amplitude of the rotational displacement of the shaft 8.

The demodulator 20 produces an output signal having a magnitude which is proportional to the amplitude of the microsyn output signal and either a positive sign when the demodulator input signals are in phase or a negative sign when those input signals are 180° out of phase. The demodulator 20 output signal is applied to servo current amplifier 32 which in turn is connected via the torquer 22 and a series resistor 28 to ground. The torquer 22 is a moving coil torquer which includes a torquer coil 24 attached to the gimbal 6 and a permanent magnet assembly 26 attached to the gyroscope 2 case. An input current to the coil 24 causes a proportional torque to be applied to the gyroscope gimbal 6 and shaft 8.

In operation, oscillator 18 continously applies a relatively high frequency a.c. signal to the primary coil 14 and demodulator 20. With the output shaft 8 in its null (or equilibrium) position, the signal at the primary coil 14 is coupled to coil 16 so that a zero amplitude signal (i.e. no signal) is applied to the second input of the demodulator 20. In response to the zero amplitude input signal at the second input to demodulator 20, a zero amplitude output signal from demodulator (i.e. no signal) is applied to the servo amplifier 32 and thus the amplifier 32 applies no input current signal to torquer 22 and, consequently, the output shaft 8 remains in its null (or equilibrium) position.

An angular input rate applied to the gyroscope about the input axis 4 causes a proportional angular displacement of the output shaft 8 from its equilibrium position. As a consequence of the angular displacement of shaft 8, the microsyn 12 introduces an output signal having an appropriate phase relationship (with the input signal) and magnitude (corresponding to the direction and magnitude of the displacement of shaft 8) to the second input of demodulator 20 from the secondary coil 16. The output signal from demodulator 20 is converted to a proportional drive current by servo amplifier 32 and the drive current signal is applied to the torquer coil 24 of the torquer 22. The gain of amplifier 32 and the magnetic coupling between the coil 24, magnet 26 and shaft 8 are arranged so that the torque produced by torquer 22 rotationally displaces the gyroscope gimbal 6 and shaft 8 back to the equilibrium position from the non-equilibrium position induced by the applied input rate.

The relationship between the applied angular input rate $T$ and torquer coil drive current $i$ in the gyroscope torque-to-balance servo loop may be expressed as $$T = i K (1 - \alpha t)$$

where $K(1-\alpha t)$ is the torquer scale factor, and $K$ is the nominal value of the torquer scale factor at a reference temperature (i.e. a constant determined by the gyroscope configuration), $t$ is temperature change from the reference temperature, and where $\alpha$ is the temperature coefficient of $K$ (i.e., $\alpha$ is substantially constant over a specified temperature range). The temperature coefficient $\alpha$ is dependent on the physical configuration of the gyroscope system and includes the effects of temperature dependent magnet strength, wheel angular momentum, torquer gap dimensions, and other factors. Thus, the expression $1-\alpha t$ is representative of the linear relationship of $T$, $i$ and $K$ as a function of temperature variation over the range where $\alpha$ is equal to a constant.

The torquer coil 24 may be characterized as having a temperature dependent resistance of the following form:

$$R = R_1 (1 + \beta t)$$

where $t$ is temperature change from the reference temperature, $R_1$ is a constant representative of the nominal resistance in ohms and $\beta$ is the resistance temperature coefficient of the torquer coil wire which is substantially constant over the temperature range at which $\alpha$ is constant.

In the circuit configuration as shown in FIG. 1, the torquer coil 24 is connected in series with the resistor 28. The resistor 28 has resistance equal to $R_2$ ohms with a negligible resistance temperature coefficient (and thus negligible resistance variation with temperature) over the specified temperature range where $\alpha$ is a constant. The voltage $V_2$ across the resistor 28 and the voltage $V_1$ across the series connected coil 24 and resistor 28 are related to the applied input rate $T$ produced at the coil 24 by the following expression:

$$\left[\frac{\alpha}{\beta} \frac{R_2}{R_1}\right] V_1 - \left[1 + \frac{\alpha}{\beta} + \frac{\alpha}{\beta} \frac{R_2}{R_1}\right] V_2 = -\frac{R_2}{R_1} T.$$

Thus, in the temperature range where $\alpha$ and $\beta$ have constant values, the applied input rate $T$ may be represented by a weighted sum of the voltages $V_1$ and $V_2$ which is independent of temperature changes $t$.

It will be noted in the temperature independent applied input rate expression that the only temperature sensitive parameters are the torquer scale factor temperature coefficient $\alpha$ and the torquer coil winding temperature coefficient $\beta$. Since the primary cause of the torquer scale factor temperature variation is due to changing magnet strength, it is important to note further that the torquer is in close proximity with the permanent magnet so that in a practical gyroscope configuration both the torquer coil and the magnet are maintained at substantially the same temperature. As a result, the above applied input rate expression is a substantially accurate representation of that relation over the temperature range where $\alpha$ and $\beta$ are constant.

Figure 2:
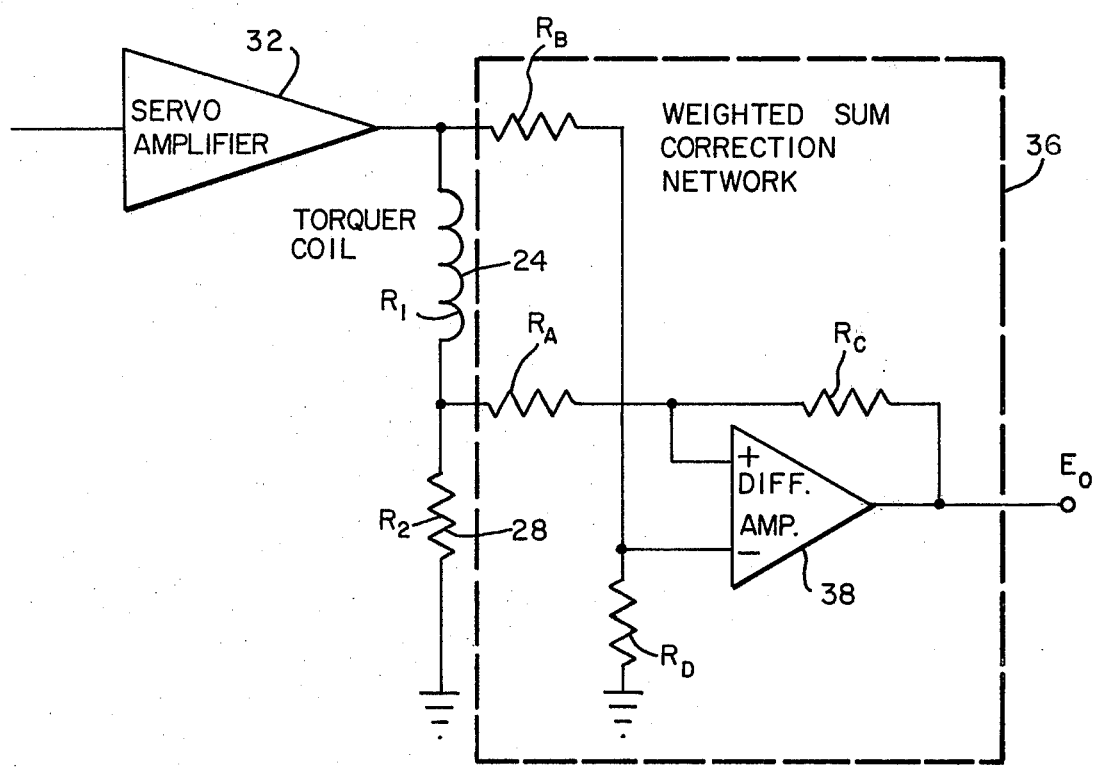
FIG. 2 shows in schematic form a portion of the torque-to-balance feedback servo loop of the system of FIG. 1.

A signal representative of the summation of the appropriately weighted products of the two voltages $V_1$ and $V_2$ can be readily generated from the torquer coil 24 and the precision readout resistor 28 and a correction network 36 so that the output signal from the network 36 is representative of the applied angular rate input and is independent of the temperature variations of the torquer scale factor. In the practical circuit configuration as shown in FIG. 2, the servo amplifier 32 from the torque-to-balance loop is shown connected to the torquer coil 24 and series resistor 28. The inputs to a weighted sum correction network 36 are connected across the coil 24. Network 36 includes the resistors $R_A$, $R_B$, $R_C$ and $R_D$ connected to the differential amplifier 38 in a weighted sum configuration.

It will be noted that the output voltage $E_o$ of the network 18 may be expressed as a weighted sum of the voltages $V_1$ and $V_2$ in the following:

$$\left[\frac{R_D}{R_A} \cdot \frac{R_A + R_C}{R_B + R_D}\right] V_1 - \left[\frac{R_C}{R_A}\right] V_2 = E_o$$

The expression for the output voltage $E_o$ of network 18 has the same form as the expression for $T$ noted above, i.e. both $E_o$ and $T$ are proportional to a weighted sum of the voltages $V_1$ and $V_2$. By relating $E_o$ to $T$ and the respective coefficients of voltages $V_1$ and $V_2$ in the expression for $E_o$ to the corresponding constants relating voltages $V_1$ and $V_2$ to $T$, a practical realization of the apparatus to correct the temperature variation of the torquer scale factor is obtained.

For an exemplary gyroscope configuration using Samarium Cobalt magnets, copper torquer coil winding, resistance $R_1$ equal to 64 ohms and resistance $R_2$ equal to 10 ohms, and also where $\alpha = -0.028\%/°F$ and $\beta = 0.216\%/°F$, the torque expression reduces to:

$$0.0203\ V_1 - 1.1499\ V_2 = -\frac{10}{K}T.$$

By relating this expression to the exemplary circuit configuration of FIG. 2 and selecting reistances $R_A$ and $R_B$ to be 100,000 ohms, then $R_C$ and $R_D$ have the values:

$R_C = $ 115,000 ohms
$R_D = $ 950 ohms

It will be noted that the resistors $R_A$ and $R_B$ are selected to be much larger than the coil resistance $R_1$ and the resistor $R_2$ so that substantially all the torquer drive current provided by the servo amplifier 32 is directed through the torquer coil 24 and the series resistor 28. The resistors $R_A$, $R_B$, $R_C$ and $R_D$ may be, for example, type RNC-60 having low temperature coefficients. However, other types of resistors may be used if the temperature coefficients are substantially equal for each of those resistors since the expression relating $E_o$, $V_1$ and $V_2$ includes only ratios of the associated resistance values and the temperature variation of the resistances will cancel.

Figure 3:
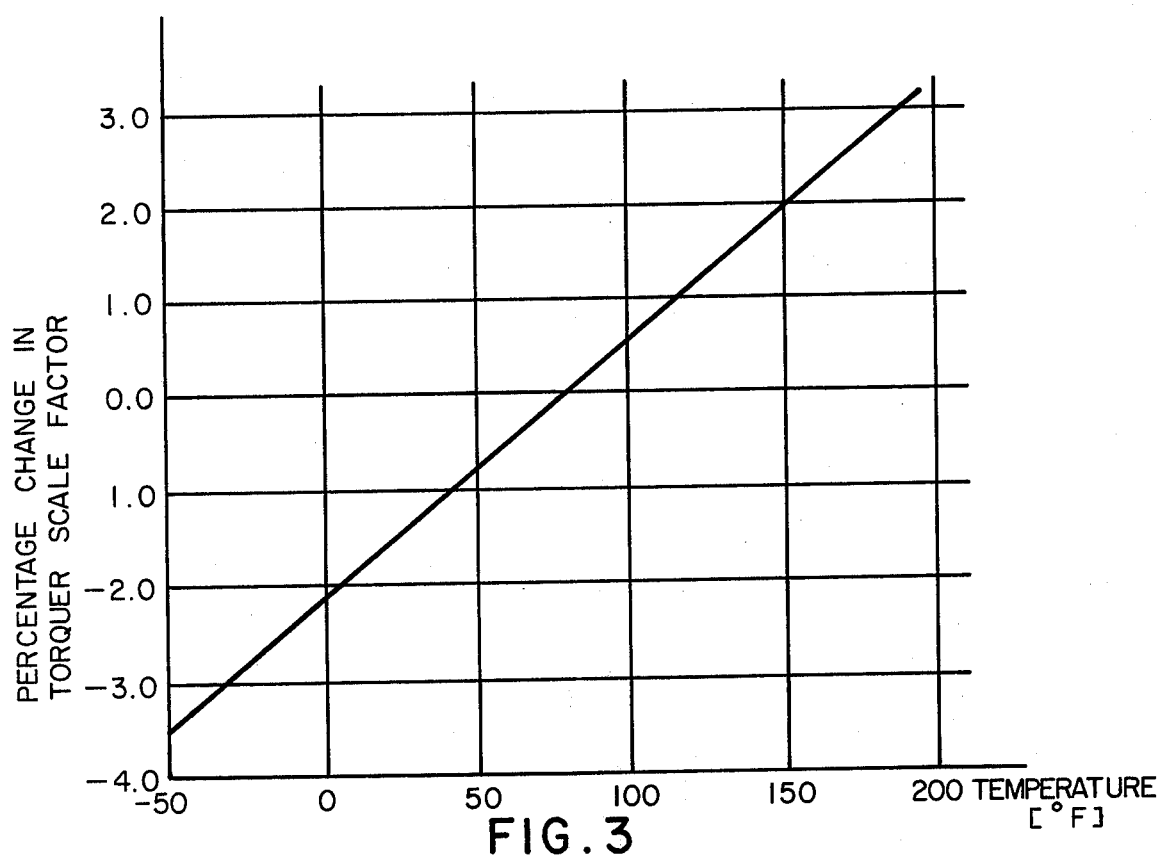
FIG. 3 shows in graph form the temperature dependence of the torquer scale factor for a rate-integrating gyroscope without temperature correction.
Figure 4:
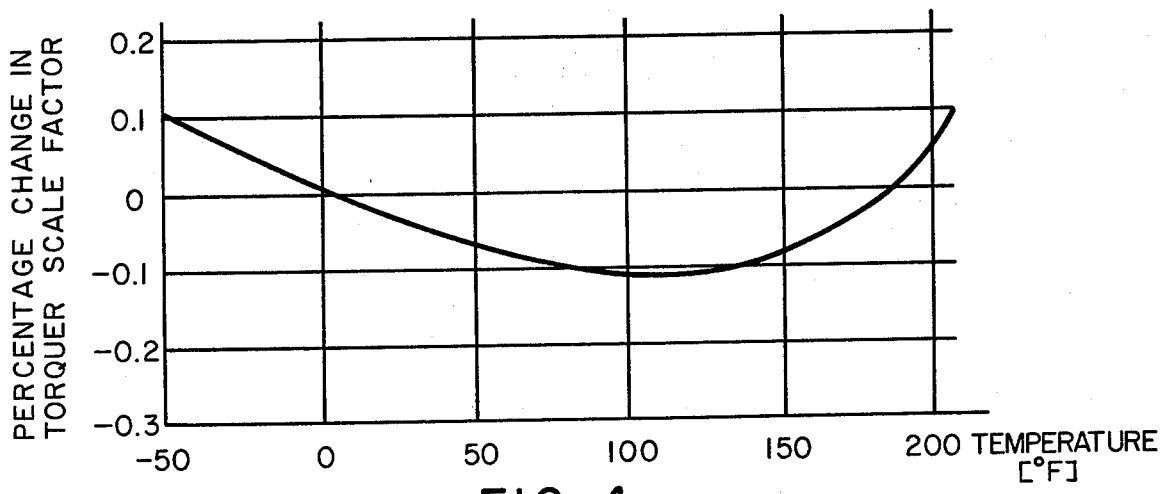
FIG. 4 shows in graph form the temperature variation of the torquer scale factor for a rate-integrating gyroscope with temperature correction in accordance with the present invention.

FIGS. 3 and 4 show, for comparison purposes, the temperature variation for the torquer scale factor for a rate-integrating gyroscope without the correction network of the present invention (FIG. 3) and with that correction network (FIG. 4). The comparison data was obtained using a Northrop gyroscope model no. GI-G6-310 with a Samarium Cobalt magnet torquer. The measurements were made over the temperature range −50°F. to +150°F. with a 40°/second, clockwise angular input rate applied to the input axis of the gyroscope. Under these conditions, the temperature coefficient of the torquer scale factor, $\alpha$, was determined to be equal to $-0.028\%/°F$. With this temperature coefficient, the torquer scale factor for the uncorrected gyroscope system varies 5.6 percent over the temperature range −50°F. to +150°F., as shown in FIG. 3.

Using the correction network described about the same gyroscope system over the same 200°F. temperature range, the torquer scale factor varied only ±0.1 percent about the 0°F. value, as shown in FIG. 4.

A correction network in accordance with the present invention may also be used in the feedback servo loop of an accelerometer or other similar instrument. In such instruments, an output characteristic which varies linearly with temperature over a specified range may be corrected by the present invention where at least one element in that system is a temperature sensitive element which has a resistance characteristic that varies linearly with temperature over the specified range. It is of course necessary in such a system that the temperature sensitive element be maintained at the substantially same temperature as the component of the servo loop which is the primary cause of the output characteristic temperature dependence. In the hereindescribed embodiment, the output temperature dependent characteristic is the torquer scale factor $K(1-\alpha t)$ and the temperature sensitive element in the gyroscope is the torquer coil having resistance $R$ equal to $R(1 + \beta t)$. As described above, the primary source of temperature dependence for the torquer scale factor is the variation in field strength of the permanent magnet of the torquer. It will be noted that the torquer magnet is in close proximity with the torquer coil and thus the magnet and coil are maintained at substantially identical temperatures.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. In a system for measuring an applied input function having a torque-to-balance feedback servo loop, said loop including a torquer having a permanent magnet and a driving coil magnetically coupled thereto, the resistance of said coil being a linear function of temperature over a predetermined temperature range, said coil being connected in series to a substantially low temperature coefficient resistor, wherein the measure of an applied input function is equal to the product of a torquer scale factor and a drive current passing through said coil, said torquer scale factor being a linear function of the temperature of said torquer over said temperature range, the improvement comprising:

a generating means connected to said torquer driving coil and said resistor for generating an output signal representative of said applied input function, said output signal being substantially independent of the temperature variation of said torquer scale factor over said temperature range wherein said generating means includes a weighted sum network having first and second input terminals and an output terminal, said second input terminal being connected to the junction point of one terminal of said coil and one terminal of said resistor, said first input terminal being connected to the terminal at the opposite end of said coil from said junction point, and wherein said output signal at said output terminal is proportional to a weighted sum of the voltages across said first and second input terminals, said output signal and said voltages being measured with respect to the terminal at the opposite end of said resistor from said junction point.

2. The measuring system according to claim 1 wherein the weighting factor for said first terminal of said weighted sum network is proportional to the ratio of the product of the torquer scale factor temperature coefficient and the nominal resistance of said series resistor to the product of the resistance of said torquer coil and the temperature coefficient of said torquer coil resistance.

3. The measuring system according to claim 1 wherein the weighting factor for said second terminal of said weighted sum network is proportional to the sum of unity plus the ratio of the torquer scale factor temperature coefficient to the temperature coefficient of the resistance of said torquer coil plus the ratio of the product of the torquer scale factor temperature coefficient and the nominal resistance of said series resistor to the product of the resistance of said torquer and the temperature coefficient of said torquer resistance.

4. The measuring system according to claim 1 wherein said weighted sum network comprises a differential amplifier having an inverting input connected by way of a first input resistor to said first input terminal and a non-inverting input connected by way of a second input resistor to said second input terminal, and an output connected to said output terminal, said differential amplifier further having a feedback resistor connected between said inverting input and said output and a ground reference resistor connected between said non-inverting input aand a ground potential reference.

5. The measuring system according to claim 1 wherein said system is a rate-integrating gyroscope system for measuring applied angular input rates about an input axis.

6. The measuring system according to claim 5 wherein the weighting factor for said first terminal of said weighted sum network is proportional to the ratio of the product of the torquer scale factor temperature coefficient and the nominal resistance of said series resistor to the product of the resistance of said torquer coil and the temperature coefficient of said torquer coil resistance.

7. The measuring system according to claim 5 wherein the weighting factor for said second terminal of said weighted sum network is proportional to the sum of unity plus the ratio of the torquer scale factor temperature coefficient to the temperature coefficient of the resistance of said torquer coil plus the ratio of the product of the torquer scale factor temperature coefficient and the nominal resistance of said series resistor to the product of the resistance of said torquer and the temperature coefficient of said torquer resistance.

8. The measuring system according to claim 5 wherein said weighted sum network comprise a differential amplifier having an inverting input connected by way of a first input resistor to said first input terminal and a non-inverting input connected by way of a second input resistor to said second input terminal, and an output connected to said output terminal, said differential amplifier further having a feedback resistor connected between said inverting input and said output and a ground reference resistor connected between said non-inverting input and a ground potential reference.

* * * * *

UNITED STATES PATENT OFFICE
CERTIFICATE OF CORRECTION

PATENT NO. : 3,882,731
DATED : May 13, 1975
INVENTOR(S) : Menno G. Koning

It is certified that error appears in the above-identified patent and that said Letters Patent are hereby corrected as shown below:

Column 4, line 55 formula:

After equal sign, amend formula to read:

$$-- = - \frac{R_2}{K} T. --$$

Column 8, line 8 - amend

[aand] to --and--

Signed and sealed this 15th day of July 1975.

(SEAL)
Attest:

RUTH C. MASON
Attesting Officer

C. MARSHALL DANN
Commissioner of Patents
and Trademarks